(12) United States Patent
Cheng et al.

(10) Patent No.: US 7,781,987 B2
(45) Date of Patent: Aug. 24, 2010

(54) METHOD AND SYSTEM FOR AUTOMATICALLY CONTROLLING POWER SUPPLY TO A LAMP OF A VEHICLE

(75) Inventors: Eric Ka Wai Cheng, Kowloon (HK); Bangalore Prabhakar Divakar, Kowloon (HK); Dao Hong Wang, Kowloon (HK)

(73) Assignee: The Hong Kong Polytechnic University, Kowloon (HK)

( * ) Notice: Subject to any disclaimer, the term of this patent is extended or adjusted under 35 U.S.C. 154(b) by 148 days.

(21) Appl. No.: 12/045,443

(22) Filed: Mar. 10, 2008

(65) Prior Publication Data

US 2009/0225559 A1    Sep. 10, 2009

(51) Int. Cl.
*H05B 37/02* (2006.01)
(52) U.S. Cl. .................................. 315/307; 315/82
(58) Field of Classification Search ............. 315/209 R, 315/291, 307, 79–82; 307/10.1, 10.8
See application file for complete search history.

(56) References Cited

U.S. PATENT DOCUMENTS

| | | | | |
|---|---|---|---|---|
| 5,859,506 | A * | 1/1999 | Lemke | 315/308 |
| 6,351,074 | B1 * | 2/2002 | Ito et al. | 315/82 |
| 6,815,898 | B2 * | 11/2004 | Schenk et al. | 315/82 |
| 7,312,587 | B2 * | 12/2007 | Okishima | 315/291 |
| 2004/0178737 | A1 | 9/2004 | Takeda et al. | |

FOREIGN PATENT DOCUMENTS

| | | |
|---|---|---|
| CN | 2523641 | 12/2002 |
| CN | 1732099 | 2/2006 |
| CN | 1760775 | 4/2006 |
| EP | 1679227 | 7/2006 |

OTHER PUBLICATIONS

PCT International Search Report and Written Opinion, International Application No. PCT/CN2009/070714; International Filing Date, Mar. 10, 2009; mailing date, Jun. 11, 2009 (8pp.).

* cited by examiner

*Primary Examiner*—Douglas W Owens
*Assistant Examiner*—Jimmy T Vu
(74) *Attorney, Agent, or Firm*—Stephen M. De Klerk; Sonnenschein, Nath & Rosenthal LLP

(57) ABSTRACT

A system for automatically controlling power supply to a lamp (101) of a vehicle, the system comprising: a detection module (20) to detect whether the vehicle is stationary or non-stationary; a controller (102) to receive a signal (25) having a first value transmitted by the detection module (20) when the vehicle is detected as stationary, and the controller (102) to receive a signal (25) having a second value transmitted by the detection module (20) when the vehicle is detected as non-stationary, wherein if the signal (20) having the first value is received by the controller (102), the controller (102) reduces the power supply to the lamp (101) from a first power level to a lower second power level in order to reduce energy consumption of the lamp (101), and if the signal (25) having the second value is received by the controller (102), the controller (102) restores the power supply to the lamp (101) from the lower second power level to the first power level.

9 Claims, 3 Drawing Sheets

METHOD AND SYSTEM FOR AUTOMATICALLY CONTROLLING POWER SUPPLY TO A LAMP OF A VEHICLE

TECHNICAL FIELD

The invention concerns a method and system for automatically controlling power supply to a lamp of a vehicle.

BACKGROUND OF THE INVENTION

A motorist using a High Intensity Discharge (HID) lamp system is able to see about 100 meters to the front of the vehicle compared to about 58 meters with standard halogen lighting. For example, a 35-Watt XENON HID lamp produces up to three times the lumens at the light source when compared to a 55-Watt halogen bulb.

Even though a HID lamp provides superior illumination and consumes less energy than standard halogen lighting, there is a desire to reduce energy consumption even further.

SUMMARY OF THE INVENTION

In a first preferred aspect, there is provided a method for automatically controlling power supply to a lamp of a vehicle, the method comprising:
detecting whether the vehicle is stationary or non-stationary;
wherein if the vehicle is detected as stationary, the power supply to the lamp is reduced from a first power level to a lower second power level in order to reduce energy consumption of the lamp, and
if the vehicle is detected as non-stationary, the power supply to the lamp is restored to the first power level.

If the vehicle is detected as stationary and if the vehicle changes state from non-stationary to stationary within a predetermined amount of time, the power supply to the lamp may be reduced from a first power level to a lower second power level.

The lamp may be a high-intensity discharge (HID) lamp.

The first power level may be approximately 35 watts and the second power level may be approximately 27.5 watts.

When the power supply is at the second power level, the lamp may be dimmed.

A speed sensor may be used to detect whether the vehicle is stationary or non-stationary The speed sensor may transmit a series of pulses to indicate that the vehicle is non-stationary and transmits no pulses to indicate that the vehicle is stationary.

The vehicle may be an automobile.

In a second aspect, there is provided a system for automatically controlling power supply to a lamp of a vehicle, the system comprising:
a detection module to detect whether the vehicle is stationary or non-stationary;
a controller to receive a signal having a first value transmitted by the detection module when the vehicle is detected as stationary, and the controller to receive a signal having a second value transmitted by the detection module when the vehicle is detected as non-stationary,
wherein if the signal having the first value is received by the controller, the controller reduces the power supply to the lamp from a first power level to a lower second power level in order to reduce energy consumption of the lamp, and if the signal having the second value is received by the controller, the controller restores the power supply to the lamp from the lower second power level to the first power level.

In a third aspect, there is provided a ballast circuit for automatically controlling power supply of a lamp of a vehicle, the circuit comprising:
a controller to receive a signal from a speed sensor, the signal being a series of pulses having a frequency corresponding to the speed of the vehicle;
wherein if there is an absence of pulses, the vehicle is determined to be stationary and the controller reduces the power supply to the lamp from a first power level to a lower second power level in order to reduce energy consumption of the lamp; and if there is a presence of pulses, the vehicle is determined to be non-stationary and the controller restores the power supply to the lamp from the lower second power level to the first power level.

The lamps of automobiles are usually operated at their steady state power of 35 W. It is an advantage of at least one embodiment of the present invention to provide an automatic method for dimming the lamps based on a signal transmitted from a speed sensor of a vehicle. A modified reference from a controller is generated to dim the lamps when the vehicle is made to stop by a driver of the vehicle. Furthermore, it is another advantage that the controller is able to ignore a dimming request when the lights are switched on while the car is initially stationary. This prevents the lamps being switched on at a lower power setting when the car is started for the first time.

BRIEF DESCRIPTION OF THE DRAWINGS

An example of the invention will now be described with reference to the accompanying drawings, in which.

DETAILED DESCRIPTION OF THE DRAWINGS

Figure 1:
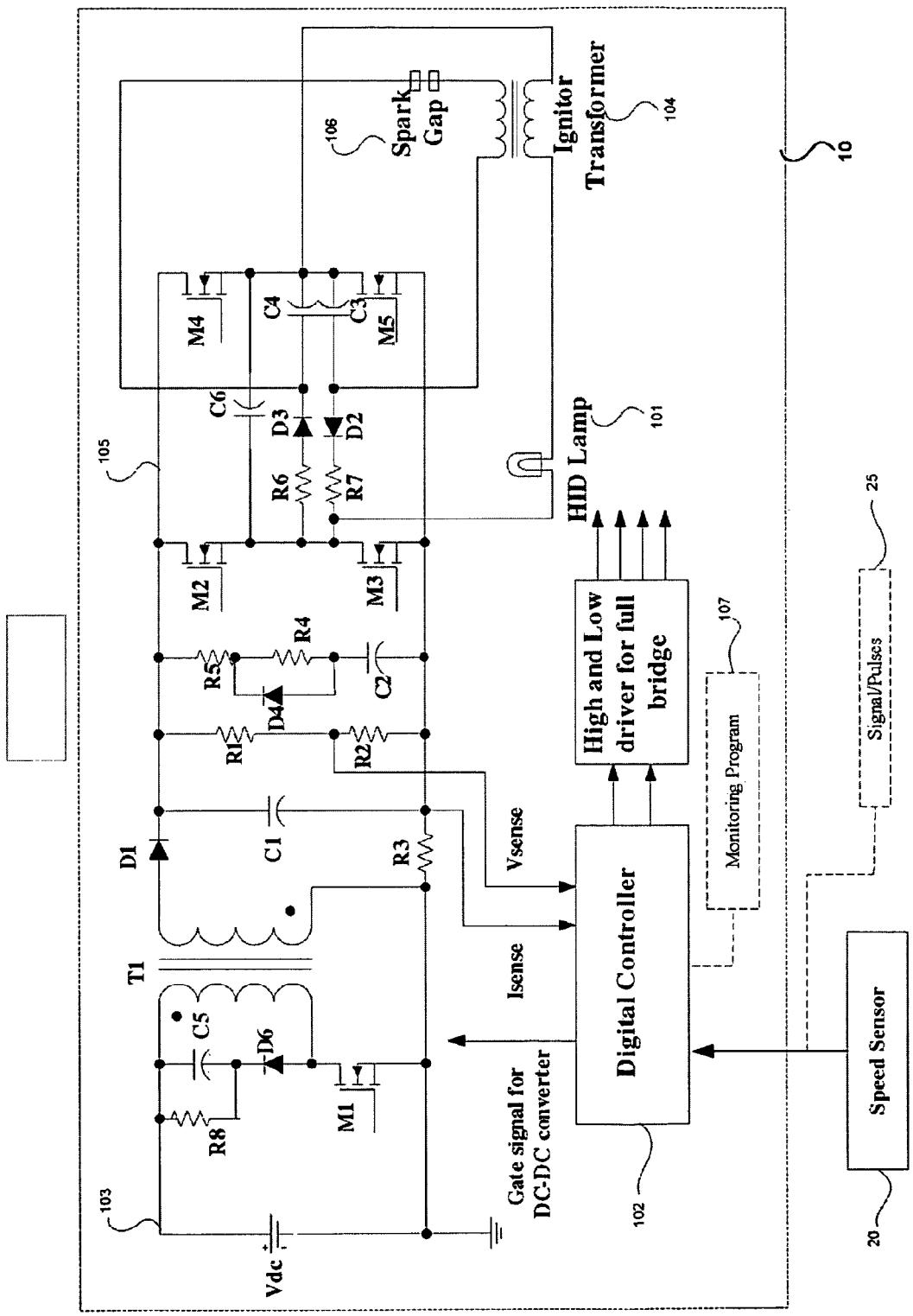
FIG. 1 is a schematic diagram of a HID ballast circuit with an integrated dimming control circuit in accordance with a preferred embodiment of the present invention.

Referring to the drawings, a system for automatically controlling power supply to a lamp 101 of a vehicle is provided. The system generally comprises: a speed sensor 20 and a controller 102. The speed sensor 20 detects whether the vehicle is stationary or non-stationary. The controller 102 receives a signal 25 having a first value transmitted by the speed sensor 20 when the vehicle is detected as stationary. The controller 102 also receives a signal 25 having a second value transmitted by the speed sensor 20 when the vehicle is detected as non-stationary. If the signal 25 having the first value is received by the controller 102, the controller 102 reduces the power supply to the lamp from a first power level to a lower second power level in order to reduce energy consumption of the lamp 101. If the signal 25 having the second value is received by the controller 102, the controller 102 restores the power supply to the lamp 101 from the lower is second power level to the first power level.

A circuit diagram of a High Intensity Discharge (HID) ballast 10 with automatic dimming control is depicted in FIG. 1. The HID lamp 101 may be mercury vapour, metal halide, high pressure sodium, or low pressure sodium light sources and luminaries. A HID ballast is a device to operate HID lamps and controls the lamp current during operation and assists in the lamp starting process. The components of a typical HID ballast circuit 10 are described for background reference only. A typical HID ballast circuit 10 generally comprises a DC-DC converter 103, igniter 104, inverter 105 and a controller 102.

The DC-DC converter 103 applies the necessary high voltage at the igniter 104 in order to initiate a spark across electrodes of the lamp 101 and then controls the power supply to the lamp 101 upon ignition. Flyback, sepic or resonant converters are some of the topologies which may be used. In a preferred embodiment, a flyback converter 103 is selected because it has the minimum part count. However, it suffers from high peak input current and therefore an input filter is required to attenuate the noise. The average magnetizing current in a sepic converter is only 50% of that in a flyback converter resulting in reduction of losses in the transformer. However, the sepic converter needs additional capacitor and an input inductor compared with the flyback converter. The flyback converter 103 comprises: switch M1, snubber circuits C5, R6 and D6, high frequency transformer T1, diode D1, output capacitors C1 and C2. The function of the snubber circuits C5, R6 and D6 are to limit the transient voltage that appears across the switch M1 and does not affect the function of the whole circuit 10. The function of transformer T1 is to step up the low AC voltage as a consequence of the switching action of the switch M1 to a high AC voltage on the secondary winding. The function of diode D1 is to convert the high AC voltage on the secondary winding of transformer T1 into DC voltage. C1 and C2 are the storage capacitors that function as filters to develop ripple free DC voltage. Therefore, the flyback converter 103 is able to step up the low DC input to high DC voltage by the switching action of the switch M1.

The igniter 104 is a high voltage transformer which converts the low voltage from the DC-DC converter 103 into a high-voltage pulse of 10-22 kV magnitude for initiating an arc across the lamp electrodes. The igniter 104 comprises: C6, spark gap 106 and a high voltage igniter transformer.

The inverter 105 is used to provide an alternating square pulses to the lamp 101 upon ignition. The inverter 105 comprises switches M2 to M5.

The controller 102 controls the ON period of the switch MI to control the output power. The controller 102 controls and dictates the mode of operation depending on the stages from start-up to steady state. The lamp 101 exhibits negative resistance characteristics and therefore the controller 102 is designed to control the lamp 101 in constant current mode in a steady state. The operating mode of the controller 102 changes from constant current mode at start-up to constant power mode after the lamp voltage begins to increase. In order to satisfy SAE standards, the lamp 101 is driven at twice the rated power at start-up but with the maximum load current limited to around 2.5 A. In a typical HID ballast circuit 10, the controller 102 processes the lamp current and the lamp voltage and develops a suitable reference signal to control the main switch M1 of the DC-DC converter 103. The circuit 10 develops a steady power of 35 W to the lamp 101.

In constant current mode, the low resolution of a microprocessor (8-bit) and ADC (32-bit) do not permit efficient implementation of a constant power algorithm based on voltage and current product. In a preferred embodiment, another approach that is simple and requires less memory is taken. A lookup table consisting of references of current is stored and accessed according to the detected lamp voltage. The following expressions explain the constant power algorithm:

$$V_{sense} \times I_{sense} = (V_{sense} \times K_V) \times (I_{lamp} \times K_I) \quad (1)$$

where $K_V$ and $K_I$ are the proportionality constants for voltage and current respectively.

$$\text{If } V_{lamp} \times I_{lamp} = P_{lamp} \quad (2)$$

$P_{lamp}$=35 W under normal operation and 27.5 W under dimming power mode $$P_{ref} = P_{lamp} \times K_V \times K_I \quad (3)$$

$$V_{sense} \times I_{sense} - P_{ref} = \text{error} \quad (4)$$

$$I_{sense} - P_{ref}/V_{sense} = \text{error}/V_{sense} \quad (5)$$

$$I_{sense} - I_{ref} = \text{error1} \quad (6)$$

Where, $I_{ref} = P_{ref}/V_{sense}$ $$\text{error1} = \text{error}/V_{sense} \quad (7)$$

(7) is the basic expression used in the microprocessor to implement the constant current mode using a lookup table as it greatly simplifies implementation.

The principle involved in dimming control is to operate the lamp 101 at a lower power setting by lowering the reference power setting from normal 35 W to dimming power mode 27.5 W. This in turn is used in the computation 20 of a new reference current setting. The new reference current setting is then compared with the current through the flyback converter 103 to determine the on period of the switch M1 of the flyback converter 103. This is done by pre-loading the value of the dimming power (27.5 W) in a register and selecting it for computing the value of the reference current (Iref) when a dimming request is made.

The function of the flyback converter 103 is to step up the DC voltage to about 300V. A voltage doubler is connected on the inverter 105 side steps up this voltage to 600 V. The spark gap 106 has a breakdown voltage of 600V. The spark gap 106 conducts when the voltage across C6 is slightly more than 600V resulting in discharge of C6 into the primary winding of igniter transformer 104. The sudden dumping of charge by C6 into the primary winding of the igniter transformer 104 causes a pulse to appear across the primary winding, which then is amplified at the secondary winding. The lamp connected in series with the secondary winding of the is igniter transformer 104 will receive a high voltage pulse required for its ignition. The voltage from the voltage doubler is applied to a primary winding of the igniter 104 through a capacitor and the spark gap 106 arrangement. The voltage doubler comprises: R6, D3, C4, R7, D2 and C3. While the voltage developed from the DC-DC converter 103 is about 300V at start up, the lamp 101 requires about 15-22 kV for ignition. Therefore, a spark gap 106 and an igniter transformer 104 (consisting of very large turns ratio) is used. However, the spark gap 106 can only conduct when its input voltage is 600 V and hence the voltage developed (300V) from the flyback DC-DC converter 103 is insufficient. Therefore, the voltage doubler connected on the switches M2 to M5 of the inverter 105 is provided to double (600V) the voltage available from the DC-DC converter 103 for supply to the spark gap 106.

After the lamp 101 is ignited, its resistance falls to a low value and voltage 30 falls to about 30V under cold conditions. Next, the controller 102 controls the lamp current at a constant value and drives the lamp 101 at about 70 W to satisfy SAE standards and thereafter controls the lamp 101 at variable power mode during which the lamp voltage increases and the lamp current decreases until the steady state is reached. At the steady state, the lamp 101 is controlled at a constant power of 35 W.

The voltage and current of a lamp 101 of the vehicle are detected by the controller 102. The controller 102 outputs gating signals to the switch M1 of the DC-DC converter 103. The gating signals are also output to switches M2 to M5 of the inverter 105. When the lamp is operating at the steady state and while the vehicle is non-stationary, the controller 102 controls the power supply to the lamp 101 at its rated power of 35 W.

The speed sensor 20 is operatively connected to a vehicle. The speed sensor 20 transmits a signal 25 which is a series of pulses and the frequency of the pulses corresponds to the speed of the vehicle. The signal 25 from the speed sensor 20 is either a positive value if the vehicle is non-stationary or a zero value when the vehicle is stationary. The signal 25 transmitted by the speed sensor 20 is received by the controller 102.

An absence of pulses results in a zero value for the signal 25. When the zero value is detected by the controller 102, the dimming power mode is initiated. A dimming mode block in the controller 102 transmits a dimming request to change the control action to the dimming power mode. This in turn generates a modified power reference signal to operate the lamp 101 at a lower power setting (27.5 watts). The dimming mode block is an algorithm that uses the detected lamp voltage and lamp current as input to generate the required reference signal for the current mode controller. This generates the appropriate gate signal to the switch M1 in the flyback converter 103. In addition to providing gating signals to the inverter 105, the controller 102 controls the transition of the various stages (constant voltage, constant current, variable power mode, constant power mode and dimming power mode) and thereby ensures stability for the entire system.

Figure 3:
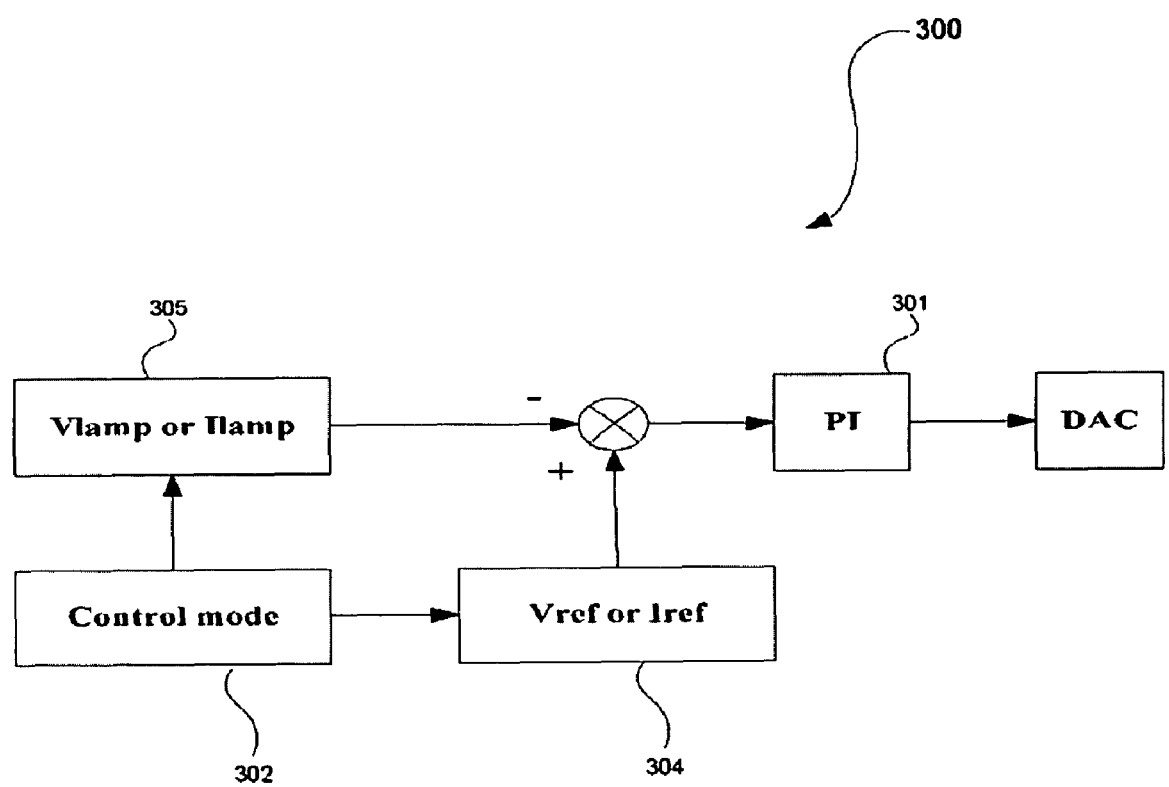
FIG. 3 is a block diagram of a control loop in accordance with a preferred embodiment of the present invention.

Referring to FIG. 3, a block diagram representation of the control loop 300 is depicted. The voltage and current of the lamp 101 is detected and compared with a suitable reference and the error signal is passed through a PI controller 301 which generates a reference signal for controlling the input current of the DC-DC converter 103. The block representing the control mode 302 determines the exact mode of operation depending on the transition stage in which the ballast 10 is in operation at the moment. For example, when the controller 102 detects that the lamp 101 is in constant voltage mode it uses Vref 304 as the reference signal and uses the pre-loaded value of the reference signal to compare with Vlamp 305. On the other hand, if the lamp 101 is operating in the steady state, the controller 102 selects Lref 304 corresponding to the steady state power of 35 W as the reference signal. Lref 304 is then compared with Llamp 305 and the error is passed through a PI controller 301. Next, the output of the PI controller 301 is compared with the flyback converter current to generate the appropriate gating signal.

When the vehicle starts to move from a stationary position and becomes non-stationary, the signal 25 transmitted by the speed sensor 20 includes pulses where the frequency of pulses corresponds to the speed of the vehicle. The output of the speed sensor 20 when the vehicle is in motion is a series of pulses and is either high (positive value), or zero when the vehicle is stationary. The signal 25 is received by the controller 102. The controller 102 detects whether the vehicle is stationary or non stationary based on the output of the speed sensor 20. A monitoring program 107 of the dimming mode block in the controller 102 detects the presence of pulses in the signal 25 and instructs the controller 102 to revert back to the normal power mode of operation. The monitoring program 107 constantly monitors the presence of the pulses from the speed sensor 20. Any absence of pulses is immediately interpreted as the vehicle being stationary. Upon detection of an absence of pulses, the monitoring program 107 instructs the controller 102 to fetch Lref value from a look up table corresponding to the lower power setting of 27.5 W. If the presence of pulses is detected, the controller 102 changes the power setting to the original steady state value of 35 W.

In a preferred embodiment, the controller 102 has a filter to ignore or discard the dimming request when the lamps 101 are switched on while the vehicle is at rest. This prevents the lamps 101 being switched on at the lower power setting when the vehicle is initially started. The controller 102 is only capable of initiating the dimming power mode after the lamp 101 has been operating at the steady state.

Figure 2:
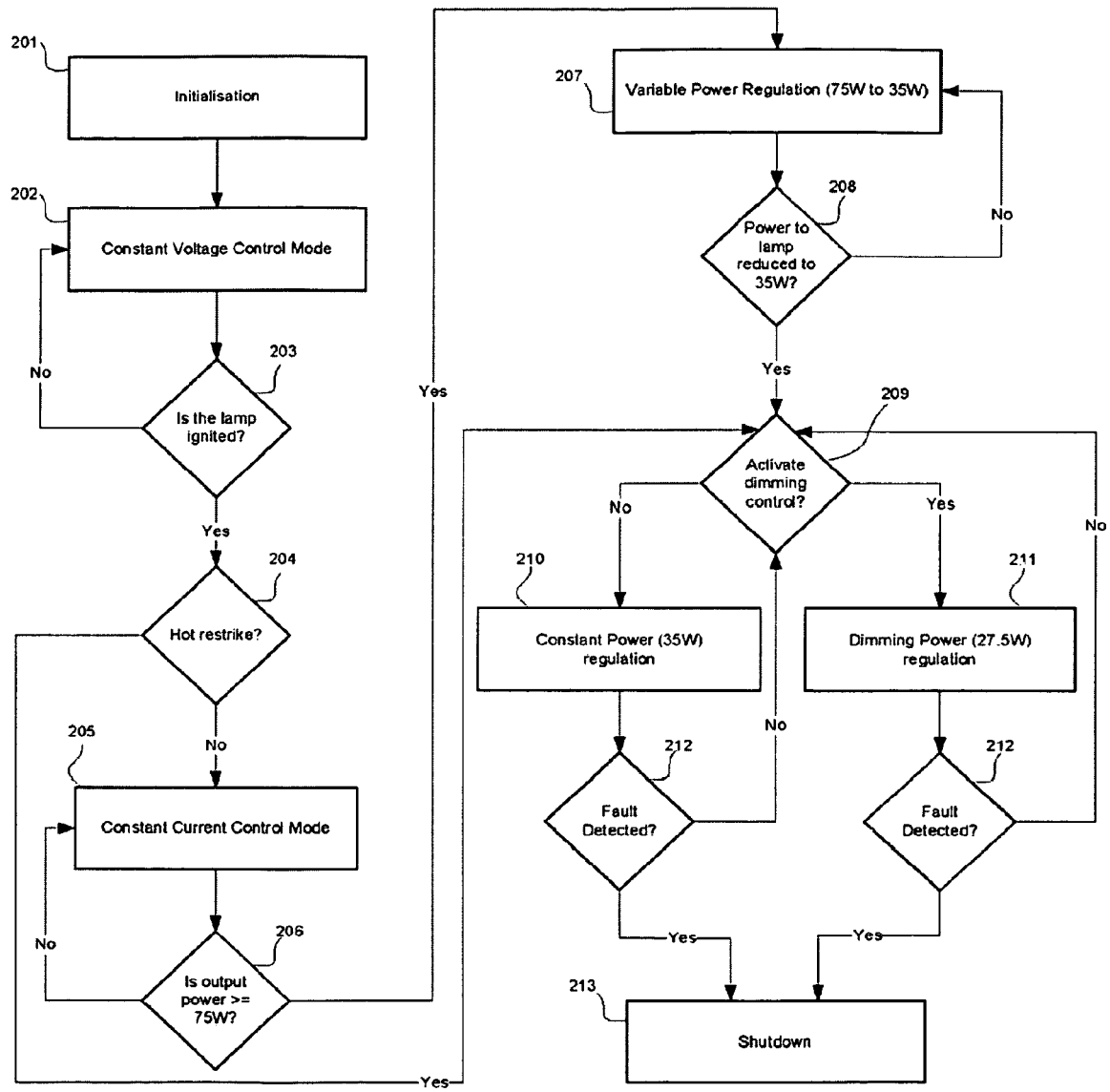
FIG. 2 is a process flow diagram of a method for automatically controlling power supply to a lamp of a vehicle in accordance with a preferred embodiment of the present invention.

Turning to FIG. 2, a typical scenario for the operation for automatically controlling power supply to a lamp 101 of a vehicle is described. The controller 102 begins initialization (201). A constant voltage control mode (202) is activated as the mode of operation so that the power supply output voltage is held constant at a predetermined level. The controller 102 detects (203) if the lamp 101 is ignited. If not ignited, the constant voltage control mode (202) is activated again.

If the lamp 101 is ignited, the controller 102 detects (204) if there is to be a hot restrike. A hot restrike enables the lamp 101 to restrike immediately on restoration of power supply after a momentary outage. If no hot restrike is necessary, the constant current control mode (205) is activated. The power supply automatically adjusts its output voltage to maintain the desired current level as load resistance changes.

If the output power is less than 75 watts, constant current control mode (205) is activated again. If the output power is greater than or equal to 75 watts, variable power regulation (207) is activated to reduce the output power from 75 watts to 35 watts. Also, if hot restrike is necessary, then variable power regulation (207) is also activated. The controller 102 detects (208) if the power supply to the lamp 101 has reduced to 35 watts. If not, variable power regulation (207) is activated again.

If the power supply has reduced to 35 watts, then the checking loop of activating dimming control is commenced (209). If the controller 102 has not detected the presence of pulses in the signal 25 from the speed sensor 20, then constant power regulation at 35 watts is applied (210). A fault check is conducted (212), and if there is a fault, the controller 102 is shutdown (213). If there is no fault, the activation of dimming control is determined (209) again. If the controller 102 has detected the presence of pulses in the signal 25 from the speed sensor 20, then dimming power regulation is activated (211) to reduce the power supply to the lamps 101 to 27.5 watts. A fault check is conducted (212), and if there is a fault, the controller 102 is shutdown (213). If there is no fault, the activation of dimming control is determined (209) again.

Although lamp 101 has been described in the singular, it is envisaged to be applicable to a plurality of lamps of the vehicle. Although the absence and presence of pulses have been described to indicate to the controller 102 whether the vehicle is stationary or non-stationary other techniques for indicating a change of state are envisaged.

It will be appreciated by persons skilled in the art that numerous variations and/or modifications may be made to the invention as shown in the specific embodiments without departing from the scope or spirit of the invention as broadly described. The present embodiments are, therefore, to be considered in all respects illustrative and not restrictive.

What is claimed:

1. A method for automatically controlling power supply to a lamp of a vehicle, the method comprising:
    detecting whether the vehicle is stationary or non-stationary;
    wherein if the vehicle is detected as stationary, the power supply to the lamp is reduced from a first power level to a lower second power level in order to reduce energy consumption of the lamp, and
    if the vehicle is detected as non-stationary, the power supply to the lamp is restored to the first power level; and
    wherein if the vehicle is detected as stationary and if the vehicle changes state from non-stationary to stationary within a predetermined amount of time, the power supply to the lamp is reduced from the first power level to the lower second power level.

2. The method according to claim 1, wherein the lamp is a high-intensity discharge (HID) lamp.

3. The method according to claim 1, wherein the first power level is approximately 35 watts and the second power level is approximately 27.5 watts.

4. The method according to claim 3, wherein when the power supply is at the second power level, the lamp is dimmed.

5. The method according to claim 1, wherein a motion sensor or a speed sensor is used to detect whether the vehicle is stationary or non-stationary.

6. The method according to claim 5, wherein the speed sensor transmits a series of pulses to indicate that the vehicle is non-stationary and transmits no pulses to indicate that the vehicle is stationary.

7. The method according to claim 1, wherein the vehicle is a moving object.

8. A system for automatically controlling power supply to a lamp of a vehicle, the system comprising:
    a detection module to detect whether the vehicle is stationary or non-stationary;
    a controller to receive a signal having a first value transmitted by the detection module when the vehicle is detected as stationary, and the controller to receive a signal having a second value transmitted by the detection module when the vehicle is detected as non-stationary,
    wherein if the signal having the first value is received by the controller, the controller reduces the power supply to the lamp from a first power level to a lower second power level in order to reduce energy consumption of the lamp, and if the signal having the second value is received by the controller, the controller restores the power supply to the lamp from the lower second power level to the first power level; and
    wherein if the vehicle is detected as stationary and if the vehicle changes state from non-stationary to stationary within a predetermined amount of time, the power supply to the lamp is reduced from a the first power level to the lower second power level.

9. A ballast circuit for automatically controlling power supply of a lamp of a vehicle, the circuit comprising:
    a controller to receive a signal from a speed sensor, the signal being a series of pulses having a frequency corresponding to the speed of the vehicle;
    wherein if there is an absence of pulses within a predetermined amount of time after detecting a presence of pulses, the vehicle is determined to have changed state from non-stationary to stationary and the controller reduces the power supply to the lamp from a first power level to a lower second power level in order to reduce energy consumption of the lamp; and if there is a presence of pulses detected within a predetermined amount of time after an absence of pulses, the vehicle is determined to have changed state from stationary to non-stationary and the controller restores the power supply to the lamp from the lower second power level to the first power level.

* * * * *